United States Patent Office 2,999,821
Patented Sept. 12, 1961

2,999,821
REGENERATION OF ANION-EXCHANGE RESINS
Sallie A. Fisher, Levittown, Pa., assignor to Rohm & Haas Company, Philadelphia, Pa., a corporation of Delaware
No Drawing. Filed Oct. 17, 1958, Ser. No. 767,770
8 Claims. (Cl. 260—2.1)

This invention relates generally to the regeneration of ion-exchange materials, and more particularly to the regeneration of quaternary ammonium anion-exchange resins.

Broadly stated, the object of this invention is to provide an improved method for regenerating such resins which have been used to remove from fluids anions such as chlorides, sulfates, and silicates which may have been present either as the salts or acids.

Another object is to provide an efficient method for removing substantially all the anions, such as chlorides, sulfates, and silicates, from quaternary ammonium resins which may be in one of those anionic forms.

A further object is to provide a method for increasing the capacity of such resins, per unit quantity of regenerant employed, for removing mineral acids and silicates from water containing same.

Still another object is to provide a method for regenerating such resins so that they will attain maximum possible capacities for removing a mineral acid or silicate from water at a lower chemicals cost per kilograin than heretofore has been possible.

The quaternary ammonium anion-exchange resins which may be improved by the method of the present invention are typically represented by the styrene-divinylbenzene products described in U.S. Patent 2,591,573 of C. H. McBurney. Such resins normally are employed in their hydroxide forms. For example, when in the hydroxide state, the resins have a high salt-splitting capacity and will remove the chloride ions of a sodium or potassium chloride solution which is placed in contact with the resins, as when the solution is mixed with the resin or flowed down through a resin column. After such contact, the liquid is converted to sodium or potassium hydroxide, the solution giving up its chloride ions to the resins in exchange for hydroxide ions.

In a similar manner, the resins are able to exchange their hydroxide ions for sulfate or chloride ions in solutions of either hydrochloric or sulfuric acids, or mixtures of both. In such cases, the hydroxide ions exchanged for these ions react with the hydrogen ions from the acid to form water. Likewise, the resins will remove silicates from aqueous liquids containing same. Inasmuch as the manner of exchanging hydroxide ions in order to remove acids or silicates is the same as for the removal of chloride from salt solutions, for simplicity of reference hereinafter mention will only be made of the chloride removal. It should be understood, however, even though chlorides alone are referred to, that essentially the same information applies to the removal of sulfates, silicates, and other anions.

The resins have a finite capacity for making such exchanges which is dependent upon the number of quaternary ammonium groups they contain. This capacity is conveniently expressed in terms of chemical equivalents per liter of exchanger. When this capacity is substantially exhausted or used up, the exchange operation must be interrupted in order to regenerate the resins, restoring them substantially to their original state. This has been done by washing or otherwise contacting the resins with a solution of strong base such as sodium or potassium hydroxide.

A principal difficulty which in the past has been experienced with the regeneration of quaternary ammonium anion-exchange resins was the substitution of a sufficient amount of hydroxide groups for the chloride ions, etc., picked up by the resins. Notwithstanding the use of large excesses of caustic, it has been practically impossible to obtain a resin which is free of chloride or other ions picked up thereby, and even getting the content of those ions on the resin exchange sites down to an acceptable tolerance has been quite costly with respect to the amount of the alkaline regenerant employed. For example, when about 25 equivalents of sodium hydroxide are used to regenerate one equivalent of resin, it is possible to remove from the anion-exchange resin only about 0.85 equivalent of the chloride.

The above-described difficulty has been overcome by the present invention which essentially involves the regeneration of the resin with sodium (or potassium) bicarbonate, or preferably a two-step regeneration in which the bicarbonate is followed by sodium (or potassium) hydroxide. The bicarbonate effectively removes substantially all the chloride ions from the resin by replacing them with bicarbonate ions. However, since anion-exchange resins generally are employed in situations where it is desirable to remove all the ions from water, it is preferable to utilize them in a manner such that the ions removed from the water are replaced by hydrogen ions. When the resins are in the hydroxide form, the hydroxide ions which they give up combine with the hydrogen ions in the system to form water. If the bicarbonate ions were left on the resin they would combine with the hydrogen ions to form carbonic acid which generally is undesirable. Hence, the further regeneration with the alkali metal hydroxide is definitely preferable.

Another important advantage of the use, in the present invention, of the bicarbonate resides in the fact that it is normally a much more economical regenerant than caustic soda. To begin with, bicarbonate of soda generally averages only about two-thirds the cost of the caustic. Additionally, and this is another surprising feature of the invention, the bicarbonate is a much more efficient regenerant. Thus, when an equivalent amount of caustic is used alone, it removes far less chloride than does an equivalent amount of bicarbonate. Further, when used in the two-step combination treatment described above, with an equivalent amount of the bicarbonate replacing a portion of the caustic necessary to give the resin a desired capacity for removing chlorides (as well as sulfates and silicates), the resin's effective capacity is actually increased a substantial amount.

The operation of my invention, and illustrations of the various advantages mentioned above, will be understood by reference to the following examples and tables. Examples 1–6 and Tables 1–6, which follow, show a comparison between the effective capacities of an otherwise identical resin when regenerated in one instance with NaOH and in another instance with $NaHCO_3$ followed by NaOH.

EXAMPLE 1

In a one-inch (diameter) column, a 200 ml. backwashed and settled bed of the chloride form of a styrene-divinylbenzene quaternary ammonium anion-exchange resin of the type disclosed in U.S. Patent 2,591,573 was conditioned by regenerating it with four liters of 1.0 N NaOH at the rate of 27 ml./min. The resin bed was rinsed free of excess hydroxide with deionized water at the rate of 100 ml./min. It was then exhausted with 0.010 N HCl at the rate of 54 ml./min. until the effluent resistance decreased to 20,000 ohms$^{-1}$.

The conditioned column was then regenerated with 160 ml.[1] of 0.60 N NaHCO$_3$ at the rate of 27 ml./min.[2]. The column was rinsed at the same rate with 200 ml. of deionized water and further regenerated with 200 ml.[3] of 1.0 N NaOH at the same rate. The column was then rinsed with deionized water at 54 ml./min. to a pH less than 9, and exhausted at the same flow rate with 0.010 N HCl until the effluent resistance decreased to 20,000 ohms$^{-1}$. The volume of HCl solution to this point was 12.4 liters,[4] giving a chloride capacity of 0.620 eq./liter resin.[4]

In the cases where the effectiveness of regenerating only with NaOH was measured, the conditioned column was regenerated with 200 ml. of 1.0 N NaOH at the rate of 27 ml./min.[3] and the balance of the above-described procedure continued.

The data obtained from this run are set forth in Table 1.

*Table 1*

HYDROCHLORIC ACID REMOVAL

| Regenerant used (eq./l. resin) | | | HCl removal capacity | |
|---|---|---|---|---|
| NaHCO$_3$ [a] | NaOH [b] | Total | Eq./l. resin | Eq./eq. total regenerant used |
| 0 | 1.00 | 1.00 | 0.378 | 0.378 |
| {0.48 | 1.00 | 1.48 | 0.620 | 0.420 |
| {0 | 1.48 | 1.48 | 0.450 | 0.304 |
| {0.95 | 1.00 | 1.95 | 0.809 | 0.415 |
| {0 | 2.00 | 2.00 | 0.533 | 0.266 |
| {0.48 | 2.00 | 2.48 | 0.701 | 0.283 |
| {0 | 2.50 | 2.50 | 0.578 | 0.231 |
| {0.95 | 2.00 | 2.95 | 0.836 | 0.283 |
| {0 | 3.00 | 3.00 | 0.632 | 0.211 |
| 0 | 4.00 | 4.00 | 0.728 | 0.182 |
| 0 | 5.00 | 5.00 | 0.798 | 0.160 |

[a] 0.6 N solution at 0.134 liters/liter resin/minute.
[b] 1.0 N solution at 0.134 liters/liter resin/minute.

EXAMPLE 2

In a one-inch (diameter) column, a 200 ml. backwashed and settled bed of the chloride form of a styrene-divinylbenzene quaternary ammonium anion-exchange resin of the type disclosed in U.S. Patent 2,591,573 was conditioned by regenerating it with 4 liters of 1.0 N NaOH at the rate of 27 ml./min. The resin bed was rinsed free of excess hydroxide with deionized water at the rate of 100 ml./min. It was then exhausted with 0.010 N H$_2$SO$_4$ at the rate of 54 ml./min. until the effluent resistance decreased to 20,000 ohms$^{-1}$.

The conditioned column was then regenerated with 160 ml.[1] of 0.60 N NaHCO$_3$ at the rate of 27 ml./min.[2] The column was rinsed at the same rate with 200 ml. of deionized water and further regenerated with 200 ml.[3] of 1.0 N NaOH at the same rate. The column was then rinsed with deionized water at 54 ml./min. to a pH less than 9, and exhausted at the same flow rate with 0.010 N H$_2$SO$_4$ until the effluent resistance decreased to 20,000 ohms$^{-1}$. The volume of H$_2$SO$_4$ to this point was 18.4 liters[4] giving a capacity of 0.920 eq. sulfate/liter resin.[4]

In the cases where the effectiveness of regenerating only with NaOH was measured, the conditioned column was regenerated with 200 ml. of 1.0 N NaOH at the rate of 27 ml./min.,[3] and the balance of the above-described procedure continued.

The data obtained from this run are set forth in Table 2.

*Table 2*

SULFURIC ACID REMOVAL

| Regenerant used (eq./l. resin) | | | Sulfate removal capacity | |
|---|---|---|---|---|
| NaHCO$_3$ [a] | NaOH [b] | Total | Eq./l. resin | Eq./eq. total regenerant used |
| 0 | 1.00 | 1.00 | 0.531 | 0.531 |
| {0.48 | 1.00 | 1.48 | 0.920 | 0.622 |
| {0 | 1.48 | 1.48 | 0.622 | 0.420 |
| {0.95 | 1.00 | 1.95 | 1.13 | 0.579 |
| {0 | 2.00 | 2.00 | 0.696 | 0.348 |
| {0.48 | 2.00 | 2.48 | 0.934 | 0.377 |
| {0 | 2.50 | 2.50 | 0.752 | 0.301 |
| {0.95 | 2.00 | 2.95 | 1.21 | 0.410 |
| {0 | 3.00 | 3.00 | 0.790 | 0.263 |

[a] 0.6 N solution at 0.134 liters/liter resin/minute.
[b] 1.0 N solution at 0.134 liters/liter resin/minute.

EXAMPLE 3

In a one-inch (diameter) column, a 200 ml. backwashed and settled bed of the chloride form of a styrene-divinylbenzene quaternary ammonium anion-exchange resin of the type disclosed in U.S. Patent 2,591,573 was conditioned by regenerating it with 4 liters of 1.0 N NaOH at the rate of 27 ml./min. The resin bed was rinsed free of excess hydroxide with deionized water at the rate of 100 ml./min. It was then exhausted with a solution having an HCl concentration of 0.0050 N and also an H$_2$SO$_4$ concentration of 0.0050 N at the rate of 54 ml./min. until the effluent resistance decreased to 20,000 ohms$^{-1}$.

The conditioned column was then regenerated with 160 ml.[1] of 0.6 N NaHCO$_3$ at the rate of 27 ml./min.[2] The column was rinsed at the same rate with 200 ml. of deionized water and further regenerated with 200 ml.[3] of 1.0 N NaOH at the same rate. The column was then rinsed with deionized water at 54 ml./min. to a pH less than 9, and exhausted at the same flow rate with the solution having an HCl concentration of 0.0050 N and also an H$_2$SO$_4$ concentration of 0.0050 N until the effluent resistance decreased to 20,000 ohms$^{-1}$. The volume of solution to this point was 14.0 liters[4], giving a capacity of 0.620 eq. chloride plus sulfate/liter resin.[4]

In the cases where the effectiveness of regenerating only with NaOH was measured, the conditioned column was regenerated with 200 ml. of 1.0 N NaOH at the rate of 27 ml./min.,[3] and the balance of the above-described procedure continued.

The data obtained from this run are set forth in Table 3.

*Table 3*

SULFURIC-HYDROCHLORIC ACID REMOVAL

| Regenerant used (eq./l. resin) | | | Acid removal capacity | |
|---|---|---|---|---|
| NaHCO$_3$ [a] | NaOH [b] | Total | Eq./l. resin | Eq./eq. total regenerant used |
| 0 | 1.00 | 1.00 | 0.435 | 0.435 |
| {0.48 | 1.00 | 1.48 | 0.701 | 0.474 |
| {0 | 1.50 | 1.50 | 0.530 | 0.353 |
| {0.95 | 1.00 | 1.95 | 0.888 | 0.455 |
| {0 | 2.00 | 2.00 | 0.595 | 0.297 |
| {0.48 | 2.00 | 2.48 | 0.806 | 0.325 |
| {0 | 2.50 | 2.50 | 0.662 | 0.265 |
| {0.95 | 2.00 | 2.95 | 0.948 | 0.321 |
| {0 | 3.00 | 3.00 | 0.713 | 0.238 |
| 0 | 4.00 | 4.00 | 0.796 | 0.199 |

[a] 0.6 N solution at 0.134 liters/liter resin/minute.
[b] 1.0 N solution at 0.134 liters/liter resin/minute.

EXAMPLE 4

In a one-inch (diameter) column, a 200 ml. backwashed and settled bed of the chloride form of a quaternary ammonium anion-exchange resin of the type dis- For footnotes to text see column 8.

closed in U.S. Patent 2,591,573 was conditioned by regenerating it with 4 liters of 1.0 N NaOH at the rate of 27 ml./min. The column was rinsed free of excess hydroxide with deionized water at the rate of 100 ml./min. It was then exhausted with a 0.0096 N NaCl solution at the rate of 54 ml./min. until an effluent chloride concentration of 0.001 N was reached.

The conditioned column was then regenerated with 176 ml.[5] of 0.60 N NaHCO$_3$ at the rate of 27 ml./min.[2] The column was rinsed at the same rate with 200 ml. of deionized water and further regenerated with 452 ml.[6] of 1.0 N NaOH at the same rate. The column was then rinsed with deionized water at 54 ml./min. to a pH less than 9, and exhausted at the same rate with the 0.0096 N NaCl solution until an effluent chloride concentration of 0.001 N was reached. The volume of test water to this point was 11.2 liters[7] giving a capacity of 0.540 eq. chloride/liter resin.[7]

In the cases where the effectiveness of regenerating only with NaOH was measured, the conditioned column was regenerated directly with 452 ml.[6] of 1.0 N NaOH at the rate of 27 ml./min. and the balance of the above-described procedure continued.

The data obtained from this run are set forth in Table 4.

Table 4
SALT-SPLITTING CAPACITY (NaCl)

| Regenerant used (eq./l. resin) | | | Chloride capacity | |
|---|---|---|---|---|
| NaHCO$_3$[a] | NaOH[b] | Total | Eq./l. resin | Eq./eq. total regenerant used |
| 0 | 2.26 | 2.26 | 0.503 | 0.223 |
| {0.53 | 2.26 | 2.79 | 0.540 | 0.190 |
| {0 | 2.80 | 2.80 | 0.500 | 0.178 |
| {1.07 | 2.26 | 3.34 | 0.659 | 0.197 |
| {0 | 3.36 | 3.36 | 0.527 | 0.157 |
| 0 | 4.52 | 4.52 | 0.563 | 0.125 |
| {1.07 | 4.52 | 5.59 | 0.746 | 0.133 |
| {0 | 5.60 | 5.60 | 0.610 | 0.109 |
| {2.14 | 4.52 | 6.66 | 0.874 | 0.131 |
| {0 | 6.60 | 6.60 | 0.633 | 0.096 |
| 0 | 9.04 | 9.04 | 0.687 | 0.076 |

[a] 0.6 N solution at 0.134 liters/liter resin/minute.
[b] 1.0 N solution at 0.134 liters/liter resin/minute.

EXAMPLE 5

In a one-inch (diameter) column, a 200 ml. backwashed and settled bed of the chloride form of a styrene-divinylbenzene quaternary ammonium anion-exchange resin of the type disclosed in U.S. Patent 2,591,573 was conditioned by regenerating it with 4 liters of 1.0 N NaOH at the rate of 27 ml./min. The column was rinsed free of excess hydroxide with deionized water at the rate of 100 ml./min. It was then exhausted with a solution having an NaCl concentration of 0.0049 N and also an Na$_2$SO$_4$ concentration of 0.0048 N at the rate of 54 ml./min. until a combined chloride+sulfate concentration of 0.001 N was reached in the effluent.

The conditioned column was then regenerated with 176 ml.[6] of 0.6 N NaHCO$_3$ at the rate of 27 ml./min.[2] The column was rinsed at the same rate with 200 ml. of deionized water and further regenerated with 452 ml.[6] of 1.0 N NaOH at the same rate. The column was then rinsed with deionized water at 54 ml./min. to a pH less than 9, and exhausted at the same rate with the solution having an NaCl concentration of NaCl=0.0049 N and also an Na$_2$SO$_4$ concentration of 0.0048 N until the combined chloride+sulfate concentration of 0.001 N was reached in the effluent. The volume of solution used to this point was 12.1 liters,[7] giving a capacity of 0.586 eq. combined sulfate+chloride/liter resin.[7]

In the cases where the effectiveness of regenerating only with NaOH was measured, the conditioned column was regenerated directly with 452 ml.[6] of 1.0 N NaOH at the rate of 27 ml./min., and the balance of the above-described procedure continued.

The data obtained from this run are set forth in Table 5.

Table 5
SALT-SPLITTING CAPACITY (NaCl—Na$_2$SO$_4$)

| Regenerant used (eq./l. resin) | | | Anion capacity | |
|---|---|---|---|---|
| NaHCO$_3$[a] | NaOH[b] | Total | Eq./l. resin | Eq./eq. total regenerant used |
| 0 | 2.26 | 2.26 | 0.522 | 0.231 |
| {0.53 | 2.26 | 2.79 | 0.586 | 0.210 |
| {0 | 2.80 | 2.80 | 0.538 | 0.192 |
| {1.07 | 2.26 | 3.34 | 0.678 | 0.203 |
| {0 | 3.36 | 3.36 | 0.562 | 0.167 |
| 0 | 4.52 | 4.52 | 0.591 | 0.131 |
| {1.07 | 4.52 | 5.59 | 0.774 | 0.138 |
| {0 | 5.60 | 5.60 | 0.631 | 0.113 |
| {2.14 | 4.52 | 6.66 | 0.847 | 0.127 |
| {0 | 6.60 | 6.60 | 0.658 | 0.100 |
| 0 | 9.04 | 9.04 | 0.742 | 0.082 |

[a] 0.6 N solution at 0.134 liters/liter resin/minute.
[b] 1.0 N solution at 0.134 liters/liter resin/minute.

EXAMPLE 6

In a one-inch (diameter) column, a 200 ml. backwashed and settled bed of the chloride form of a styrene-divinylbenzene quaternary ammonium anion-exchange resin of the type disclosed in U.S. Patent 2,591,573 was conditioned by regenerating it with 4 liters of 1.0 N NaOH at the rate of 27 ml./min. The column was rinsed free of excess hydroxide with deionized water at the rate of 100 ml./min. It was then exhausted with a solution having an HCl concentration of 0.0040 N HCl and also containing 20 mg./l. SiO$_2$ at the rate of 54 ml./min. until a leakage of 0.1 mg. SiO$_2$/liter was reached.

The conditioned column was then regenerated with 160 ml.[1] of 0.6 N NaHCO$_3$ at the rate of 27 ml./min.[2] The column was rinsed at the same rate with 200 ml. of deionized water and further regenerated with 200 ml.[3] of 1.0 N NaOH at the same rate. The column was then rinsed with deionized water at 54 ml./min. to a pH less than 9, and exhausted at the same rate with the solution having an HCl concentration of 0.0040 N and also containing 20 mg. SiO$_2$/l. until a leakage of 0.1 mg. SiO$_2$/liter was reached in the effluent. The volume of solution used to this point was 17.1 liters,[4] giving a capacity of 0.427 eq./liter resin.[4]

In the cases where the effectiveness of regenerating only with NaOH was measured, the conditioned column was regenerated with 200 ml. of 1.0 N NaOH at the rate of 27 ml./min.,[3] and the balance of the above-described procedure continued.

The data obtained from this run are set forth in Table 6.

Table 6
SILICA REMOVAL CAPACITY

| Regenerant used (eq./l. resin) | | | Anion capacity | |
|---|---|---|---|---|
| NaHCO$_3$[a] | NaOH[b] | Total | Eq./l. resin | Eq./eq. total regenerant used |
| 0 | 1.00 | 1.00 | 0 | 0 |
| {0.48 | 1.00 | 1.48 | 0.427 | 0.288 |
| {0 | 1.60 | 1.60 | 0.398 | 0.249 |
| {0.48 | 1.60 | 2.08 | 0.631 | 0.303 |
| {0 | 2.00 | 2.00 | 0.500 | 0.250 |
| {0.95 | 1.60 | 2.55 | 0.708 | 0.278 |
| {0 | 2.50 | 2.50 | 0.551 | 0.220 |
| {0.48 | 2.00 | 2.48 | 0.683 | 0.275 |
| {0.95 | 2.00 | 2.95 | 0.724 | 0.245 |
| {0 | 3.00 | 3.00 | 0.592 | 0.197 |
| 0 | 4.00 | 4.00 | 0.647 | 0.162 |
| {0.48 | 4.00 | 4.48 | 0.803 | 0.179 |
| {0 | 4.50 | 4.50 | 0.675 | 0.150 |

[a] 0.6 N NaHCO$_3$ at 0.067 liters/liter resin/minute.
[b] 1.0 N NaOH at 0.067 liters/liter resin/minute.

For footnotes to text see column 8.

Example 7 and Table 7, which follow, show by way of comparison the respective efficiencies of the one-step NaOH regeneration treatment of the prior art and the two-step (NaHCO$_3$ followed by NaOH) treatment of the present invention. The comparison is based on the use of samples of the same quaternary ammonium resin: some of the samples were regenerated only with NaOH; other samples were first regenerated with NaHCO$_3$ and then with NaOH, the amounts of the latter being kept static while the amounts of the former were varied.

EXAMPLE 7

In a one-inch (diameter) column of a 200 ml. backwashed and settled bed of the chloride form of a quaternary ammonium anion-exchange type resin of the type disclosed in U.S. Patent 2,591,573 was conditioned by regenerating it with 315 ml.[8] of 0.6 N NaHCO$_3$ at the rate of 13.5 ml./min. It was rinsed with 400 ml. of deionized water at the same rate and further regenerated with 1600 ml.[9] of 1.0 N NaOH at the same rate. The column was rinsed with deionized water at 54 ml./min. until the effluent pH was below 9.

The resin so prepared was removed from the column, mixed and drained. A ten gram sample of the moist resin was placed in a funnel and eluted with exactly one liter of 0.6 N Na$_2$SO$_4$, thereby displacing the hydroxide, carbonate and chloride ions associated with the resin functional groups into the effluent. The milliequivalents of hydroxide, chloride and carbonate in the effluent were determined and the equivalent percent residual chloride calculated as follows:

$$\frac{\text{Meq. Cl}^-}{\text{Meq. Cl} + \text{Meq. OH} + \text{Meq. CO}_3} \times 100 = \text{residual percent Cl}$$

or, for the case in point:

$$\frac{2.00}{2.00 + 12.79 + 2.22} \times 100 = 11.8\% \text{ Cl}^-$$

In the cases where the effectiveness of regenerating only with NaOH was measured, the conditioned column was regenerated directly with 1600 ml.[9] of 1.0 N NaOH at the rate of 27 ml./min., and the balance of the above-described procedure continued.

The data obtained from this run are set forth in Table 7.

Table 7
REMOVAL OF CHLORIDE FROM ANION-EXCHANGE RESIN

| Regenerant used (eq./liter) | | | Residual chloride, percent total resin sites |
|---|---|---|---|
| NaHCO$_3$ [a] | NaOH [b] | Total | |
| 0 | 24.0 | 24.0 | 15.3 |
| 0 | 16.0 | 16.0 | 16.3 |
| 0 | 8.0 | 8.0 | 18.5 |
| 0.95 | 8.0 | 8.95 | 11.8 |
| 1.90 | 8.0 | 9.90 | 7.6 |
| 3.80 | 8.0 | 11.80 | 2.9 |
| 7.60 | 8.0 | 15.60 | 1.7 |

[a] As 0.6 N solution at 0.067 liters/liter resin/minute.
[b] As 1.0 N solution at 0.067 liters/liter resin/minute.

In Example 8, which follows, a diquaternary ammonium ion-exchange resin in the chloride form was used. Samples of this resin were separately regenerated with different amounts of two regenerants, one set with NaOH and another with NaHCO$_3$, and the amounts of chloride left on the resin after each such regeneration were measured. A comparison of the two sets of results shows quite vividly the marked improvement in efficiency of the bicarbonate over the caustic regenerant.

EXAMPLE 8

In a one-half inch (diameter) column, a 20 ml. backwashed and settled bed of the chloride form of a resin comprising a chloromethylated styrene-divinylbenzene copolymer, aminated with tetramethyl ethylene diamine and quaternized with methyl chloride, was regenerated with 76.4 ml.[10] of 0.985 N NaOH at the rate of 2.68 ml./min. The bed was rinsed with one liter of deionized water and eluted with one liter of 1.0 N NaNO$_3$. The chloride content of the NaNO$_3$ effluent was determined by titration with silver nitrate. The total chloride initially present in the bed was obtained by eluting 20 ml. of chloride form directly with one liter of 1.0 N NaNO$_3$ and titrating the chloride in the sodium nitrate effluent.

The same experiment was repeated, except that 94.9 ml.[10] of 0.565 N NaHCO$_3$ was substituted for the NaOH. These two experiments represent regeneration with 3.76 eq. of NaOH/liter and 3.76 eq. of NaHCO$_3$/liter, respectively. Similar experiments were run employing each regenerant in amounts equal to 7.58 eq. liter and 11.34 eq./liter, respectively. The data for all three sets of runs are as follows:

Table 8
REGENERATION WITH SODIUM BICARBONATE AND SODIUM HYDROXIDE

| Regenerant used | Residual chloride, percent total resin sites | |
|---|---|---|
| | NaOH [a] | NaHCO$_3$ [b] |
| 3.76 eq./liter | 55.8 | 15.3 |
| 7.58 eq./liter | 43.7 | 2.5 |
| 11.34 eq./liter | 38.3 | 1.4 |

[a] 0.985 N NaOH at 0.134 liters/liter resin/minute.
[b] 0.565 N NaHCO$_3$ at 0.134 liters/liter resin/minute.

FOOTNOTES

The following numbered footnotes are keyed to the corresponding numbers which appear throughout the specification. They serve to clarify certain of the expressions or statements set forth above.

[1] Figure specified for use of 0.48 eq. of NaHCO$_3$ per liter of resin. Volume required for other usage may be calculated from the equation:

$$\frac{\text{Eq. NaHCO}_3 \text{ used/liter} \times \text{ml. of resin}}{\text{Normality of NaHCO}_3} = \text{ml. of NaHCO}_3$$

[2] Figure specified for flow rate of 0.134 liter/liter resin/minute. Volume for other flow rates may be calculated from the equation:

Flow rate (liters/liter resin/min.) × ml. of resin = flow volume (ml./min.)

[3] Figure specified for use of 1.00 eq. of NaOH per liter of resin. Volume required for other usage may be calculated from the equation:

$$\frac{\text{Eq. NaOH used/liter} \times \text{ml. of resin}}{\text{Normality of NaOH}} = \text{ml. of NaOH}$$

[4] Figure specified for a 200 ml. resin bed conditioned as above and regenerated with 0.48 eq. NaHCO$_3$ per liter followed by 1.00 eq. NaOH per liter. Volumes for other regenerant usage or bed size may be calculated from the experimentally determined capacities by the following equation:

$$\frac{\text{Liters test water used} \times \text{normality of test water}}{\text{Volume of resin in liters}} = \text{capacity in eq./liter}$$

[5] Figure specified for use of 0.53 eq. of NaHCO$_3$ per liter of resin. Volume required for other usage may be calculated from the equation in footnote No. 1.

[6] Figure specified for use of 2.26 eq. of NaOH per liter of resin. Volume required for other usage may be calculated from the equation in footnote No. 3.

[7] Figure specified for a 200 ml. resin bed conditioned as above and regenerated with 0.53 eq. NaHCO$_3$ per liter followed by 2.26 eq. NaOH per liter. Volumes for other regenerant usage may be calculated from the equation in footnote No. 4.

[8] Figure specified for use of 0.95 eq. NaHCO$_3$ per liter of resin. Volume required for other usage may be calculated from the equation in footnote No. 1.

[9] Figure specified for use of 8.0 eq. NaOH per liter of resin. Volume required for other usage may be calculated from the equation in footnote No. 3.

[10] Figures specified for use of 3.76 eq. regenerant per liter. Volume required for other usage may be calculated from the equations in footnotes No. 1 and No. 3.

The foregoing clearly illustrates that my invention has provided: (a) an improved method for regenerating anion-exchange resins which have been used to remove from fluids such anions as chlorides, sulfates, and silicates; (b) an efficient method for removing substantially all the anions, such as chlorides, sulfates, and silicates, whether present as the salts or the acids, from anion-exchange resins having any of those ions on their exchange sites; (c) a method for increasing the capacity of such resins for removing mineral acids and silicates from aqueous solutions thereof; and (d) a method for regenerating such resins so that they will attain maximum possible capacities for removing mineral acids or silicates from water at a lower chemicals cost than heretofore has been possible.

It will be understood that the degree of regeneration accomplished will depend upon the quantity of anions to be removed and the amount of regenerant, as well as the concentration thereof, that is employed in each instance. These are empirical factors which are readily determined to suit the user's requirements. In these respects, the invention has wide latitude. Otherwise, the invention is to be construed in the light of the following claims.

I claim:

1. A method for removing chloride and silicate anions from a styrene-divinylbenzene quaternary ammonium anion-exchange resin which has at least one of said anions on the resin's ion-exchange sites, said method comprising treating the anion-exchange resin containing any chloride and silicate anions with an alkali metal bicarbonate, whereby said anions on the resin are replaced by bicarbonate ions and the resin is then capable of being used so as ultimately to take on more of said anions.

2. The method of claim 1 in which the alkali metal in the bicarbonate is a member of the class consisting of sodium and potassium.

3. The method of claim 2 in which the alkali metal is sodium.

4. The method of claim 2 in which the alkali metal is potassium.

5. A method of restoring the ability of a styrene-divinylbenzene quaternary ammonium anion-exchange resin to exchange its hydroxide ions for chloride and silicate ions when the resin exchange sites have been laden with at least one anion from the class consisting of chlorides and silicates, said method comprising first treating the resin with an alkali metal bicarbonate, and then treating the resin with an alkali metal hydroxide.

6. The method of claim 5 in which the alkali metals in the bicarbonate and the hydroxide are members of the class consisting of sodium and potassium.

7. The method of claim 6 in which at least one of the alkali metals is sodium.

8. The method of claim 6 in which at least one of the alkali metals is potassium.

References Cited in the file of this patent

UNITED STATES PATENTS

| | | |
|---|---|---|
| 2,164,156 | Liebknecht | June 27, 1939 |
| 2,392,105 | Sussman | Jan. 1, 1946 |
| 2,395,825 | Hesler | Mar. 5, 1946 |

OTHER REFERENCES

C. and E. News, 29, page 1146 (March 19, 1951).

Nachod et al.: "Ion Exchange Technology," p. 248, Academic Press (1956).